United States Patent [19]

Hemphill

[11] 4,069,692

[45] Jan. 24, 1978

[54] AIRCRAFT ANTI-THEFT DEVICE

[76] Inventor: Robert L. Hemphill, 140 E. Rosewood, Rialto, Calif. 92376

[21] Appl. No.: 679,768

[22] Filed: Apr. 23, 1976

[51] Int. Cl.² .................. B60R 25/04; E05B 13/00
[52] U.S. Cl. .......................................... 70/207; 70/212; 244/83 A; 292/DIG. 2
[58] Field of Search .............. 70/181, 200, 202, 203, 70/207, 209, 211, 212, 253, 254, 255, 256; 292/DIG. 2; 244/83 A

[56] References Cited

U.S. PATENT DOCUMENTS

| 1,169,557 | 1/1916 | Moore | 70/181 X |
|---|---|---|---|
| 1,388,149 | 8/1921 | Friedrich | 70/203 |
| 1,439,552 | 12/1922 | Johnson | 70/212 |
| 1,830,383 | 11/1931 | Bos | 292/DIG. 2 X |
| 2,458,002 | 1/1949 | Kaskouras | 292/DIG. 2 X |
| 2,709,356 | 5/1955 | Bristow | 70/181 X |
| 3,306,643 | 2/1967 | Reed | 292/DIG. 2 X |
| 3,330,504 | 7/1967 | Lewis | 244/83 A |
| 3,710,606 | 1/1973 | Prince | 70/203 |
| 3,739,608 | 6/1973 | Young | 70/209 |
| 3,898,823 | 8/1975 | Ludeman | 244/83 A X |

FOREIGN PATENT DOCUMENTS

| 151,373 | 8/1952 | Australia | 70/203 |
|---|---|---|---|
| 1,207,972 | 9/1959 | France | 70/202 |
| 849,539 | 4/1939 | France | 70/207 |
| 518,760 | 1/1921 | France | 70/253 |

Primary Examiner—Roy D. Frazier
Assistant Examiner—Thomas J. Holko
Attorney, Agent, or Firm—James E. Brunton

[57] ABSTRACT

An aircraft anti-theft device for use with an instrument panel-mounted engine control of the type typically found in light aircraft which has a control shaft provided with a hand-grip knob at one end thereof mounted for telescopic movement relative to the instrument panel from an extended engine-idle position to a depressed full power position, or from an extended full-lean (idle cutoff) position to a depressed full-rich position, depending on the type of control, includes a housing covering the hand-grip knob and a shaft enclosure member which fits over the control shaft in its extended position for preventing its telescopic movement. The anti-theft device also includes a peripherally slotted segment connected between two outer segmented portions of the shaft enclosure member to receive an ordinary padlock whose shank fits into the slot to keep the lock from being dislodged and to prevent removal of the enclosure member.

6 Claims, 5 Drawing Figures

AIRCRAFT ANTI-THEFT DEVICE

BACKGROUND OF THE INVENTION

1. Field of the Invention

This invention relates in general to locking devices and in particular to an aircraft anti-theft locking device adapted to fit over a telescoping instrument panel-mounted engine control knob and shaft in its extended engine-idle or full-lean (idle cutoff) position, depending on the type of control.

2. Discussion of the Prior Art

Various forms of locking devices have found extensive use in automotive applications which include hand-brake control locks, steering column locks, gear-shift lever locks, and even remote locking devices such as that which may be found on early engine carburetor controls. While some of these devices also have application in aircraft use, to applicant's knowledge minimal effort has been directed specifically toward aircraft anti-theft devices. Although a most effective way to inhibit theft of an aircraft is to prevent or restrict the operation of its engine controls, particularly throttle or mixture controls, none of the prior art devices known to applicant adopt or suggest such an approach.

Applicant is familiar with the following prior art patents which represent the most pertinent art known to applicant and which serve to clearly illustrate the novelty of the present invention:

U.S. Pat. Nos. 1,129,570 - Horton U.S. Pat. Nos. 2,709,356 - Bristow
U.S. Pat. Nos. 1,169,557 - Moore U.S. Pat. Nos. 2,963,896 - Hoffman
U.S. Pat. Nos. 1,471, 515 - Eulitt U.S. Pat. Nos. 3,710,606 - Prince

SUMMARY OF THE INVENTION

Applicant herein has conceived of a new and useful aircraft anti-theft device adapted for use with engine throttle or mixture controls. An aircraft engine throttle control is in its engine-idle position when fully extended outward from the instrument control panel. The engine mixture control is in its full-lean (idle cutoff) position when fully extended outward from the instrument control panel. The present invention has an enclosure member which can be placed over the shaft of either of these controls by receiving the shaft in a full length longitudinal slot. The enclosure member, when properly positioned, prevents telescopic movement of the engine control relative to the instrument control panel and also partially conceals the shaft from view and from convenient access with a cutting tool. A conventional hand-grip knob on the control is substantially enclosed by a housing receivable over the knob, the housing being integrally connected to the shaft enclosure member. A conventional padlock may be used to secure the enclosure member in position on the shaft.

Accordingly, it is an object of this invention to provide an aircraft anti-theft device for securely locking a telescoping engine control in its extended engine-idle position or full-lean (idle cutoff) position, depending upon the type of control being locked.

It is a further object of this invention to provide a device having a member enclosing an engine control shaft in a manner which at least partially conceals it from easy view and convenient access with a cutting tool.

It is another object of this invention to provide a device having a housing for substantially enclosing a hand-grip knob, which is attached to the end of the control shaft to prevent ready removal of the knob and the resulting easy removal of the enclosure member from the shaft by slipping it off of the unrestricted end of the shaft.

It is another object of this invention to provide a device having a member enclosing an engine control shaft adapted to receive the shank of a conventional lock such as a common padlock to prevent the removal of the member from the shaft.

A further object of this invention is to provide an aircraft anti-theft device for preventing operation of an engine control which is simple in design, rugged in construction, and economical to manufacture.

For a better understanding of this present invention, together with other and further objects thereof, reference is made to the following description taken in connection with the accompanying drawings in which a preferred embodiment of the invention is illustrated, the scope of the invention being pointed out and contained in the appended claims.

DESCRIPTION OF THE PREFERRED EMBODIMENTS

Figure 1:
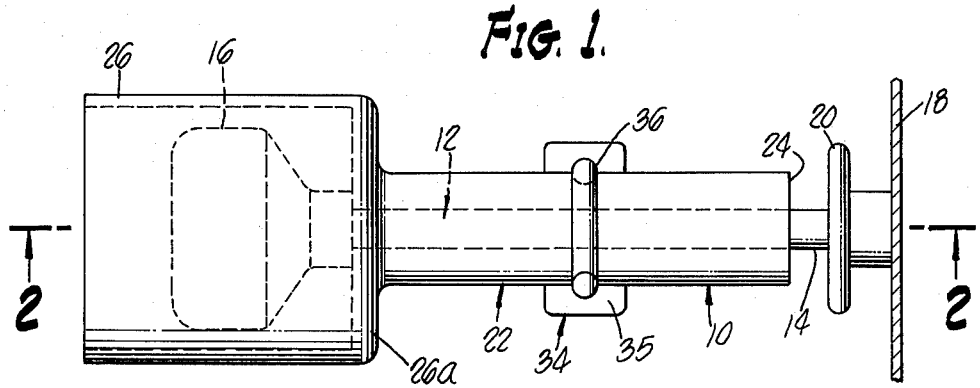
FIG. 1 is a top view of an engine control mounted on an instrument control panel showing the knob and telescoping shaft in its extended position with the anti-theft device locked in its secured position.

Turning to FIG. 1, the preferred embodiment of the present invention is shown. The aircraft anti-theft or throttle locking device 10 is shown in position on a telescoping engine control 12 which includes a control shaft 14 and a hand-grip knob 16 connected thereto. The control shaft 14 and hand-grip knob 16 are shown mounted on an aircraft instrument control panel 18. A control-shaft vernier friction lock 20 is used for adjusting the degree of resistance to telescopic motion of shaft 12 when in normal operating use and forms no part of this invention, but is shown for purposes of clarity in operation of the engine control 12.

Figure 2:
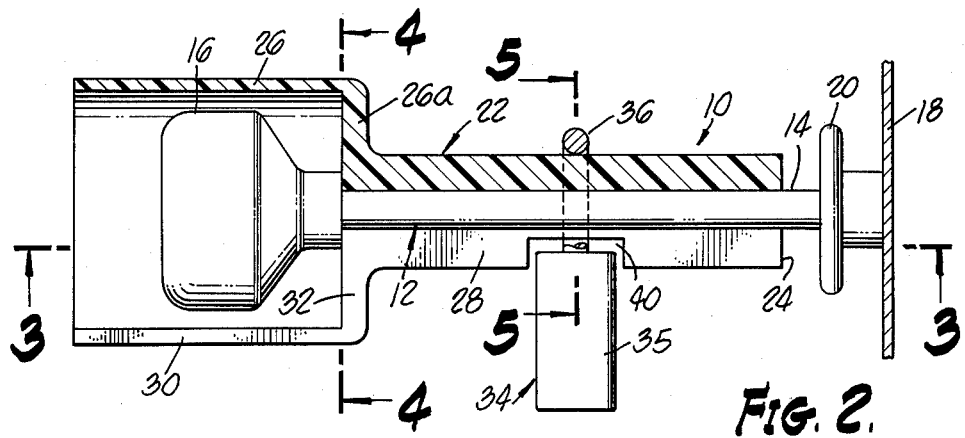
FIG. 2 is a sectional view of the anti-theft device taken along the line 2—2 of FIG. 1.

Referring to FIG. 2, the anti-theft device 10 comprises a shaft enclosure means provided in the embodiment shown in the drawings in the form of a slotted cylindrically shaped shaft enclosure member 22 which may be positioned over the shaft 14 when the shaft is in its fully extended position with respect to the panel 18. One end 24 of enclosure member 22 will butt up against the friction lock 20 when inward pressure is applied to knob 16 which is, in turn, disposed in engagement with a housing 26. As seen by also referring to FIG. 4, housing 26 comprises a hollow cylinder open at one end and closed at its opposite end 26a. In this form of the invention, housing 26 is integrally connected at its closed end to enclosure member 22. By restricting the telescopic motion of the engine control 12 with member 22 in place, said control will remain in its extended engine-idle or full-lean (idle cutoff) position, depending upon whether the particular engine control is a throttle control or a mixture control device, and the engine cannot operate.

Figure 3:
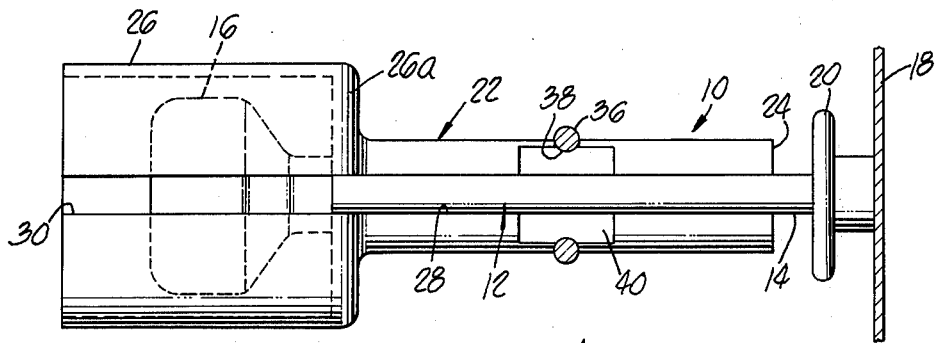
FIG. 3 is a bottom view taken along lines 3—3 of FIG. 2 showing the engine control mounted on an instrument control panel and showing the knob and telescoping shaft in its extended position with the anti-theft device in position.

As best seen in FIG. 3, enclosure member 22 has a longitudinal slot 28 disposed along the full length thereof which is of a dimension sufficient to closely receive the control shaft 14. Housing 26 has a longitudinal slot 30 formed in the periphery thereof and a radially disposed slot 32 formed in its closed end 26a. Slots 30 and 32 are in axial alignment with slot 28 and are arranged to permit the housing to be positioned over and enclose the knob 16 as well as the outer end portion of the shaft 14. Housing 26 serves the important function of restricting access to the shaft 14 from any common cutting tool. As illustrated in the drawings, if housing 26 were not present, knob 16 could be easily removed and enclosure member 22 could readily be slipped off the end of shaft 14, thereby rendering the remaining portion of the engine control 12 operable.

Enclosure member 22 is secured into locking position by a locking means, shown here as a common padlock 34 having a body portion 35 and pivotally mounted link portion 36. The locking means serves to lock the encapsulation means in an operable position over the control shaft and for this purpose, as shown in FIG. 3, link 36 of padlock 34 is closely received into a peripheral slot 38 formed centrally of member 22. Further, as illustrated in FIG. 2, padlock 34 is partially received into larger flat bottomed transversely extending slot 40 formed in the lower side of member 22 to locate the padlock in the operable locking position shown.

Figure 4:
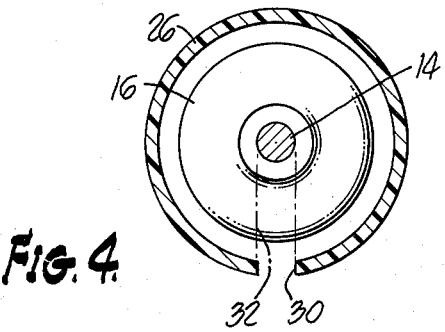
FIG. 4 is a sectional view of the anti-theft device taken along lines 4—4 of FIG. 2.

FIG. 4 shows a sectional view of housing 26, its internal face 26a, and slots 30 and 32, the functions of each of these having been fully described in the foregoing description.

Figure 5:
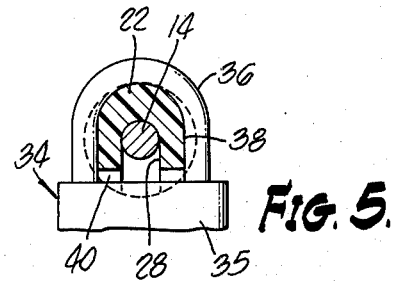
FIG. 5 is a sectional view of the anti-theft device taken along lines 5—5 of FIG. 2.

FIG. 5 shows a sectional view of member 22 with slots 28, 38 and 40 which are depicted for further clarity.

The cylindrical member 22 and the housing 26 of the device may be constructed of any suitably hard material such as steel or other metal, and may be cast, machined or otherwise formed in an appropriate manner. Depending upon the material selected, the parts may be constructed separately and joined together, or the device may be manufactured as a single piece.

Having now described the invention in detail in accordance with the requirements of the patent statutes, those skilled in this art have no difficulty in maing changes and modifications in the individual parts or their relative assembly in order to meet specific requirements or conditions. Such changes and modifications may be made without departing from the scope and spirit of the invention, as set forth in the following claims.

I claim:

1. An aircraft anti-theft device for use with an instrument panel-mounted engine control of the type typically found in light aircraft having a control shaft provided with a hand-grip knob at one end thereof, said shaft being mounted for telescopic movement relative to said instrument panel from an extended engine-inoperable position to a depressed engine-operable position, said device comprising:

a. a generally cylindrical rigid member having a longitudinally extending slot therein of a width sufficient to closely receive the control shaft when the latter is in the engine-inoperable position, said member being adapted to substantially enclose said control shaft to prevent access thereto by a cutting tool;
   b. a hollow cylindrical rigid housing integral with said cylindrical member to form a rigid single-piece engine control enclosure, said housing being open at one end and substantially closed at the opposite end, and having a longitudinally extending slot formed in the periphery thereof and a radially-extending slot formed in the closed end thereof to facilitate positioning said housing over the hand-grip knob; and
   c. locking means for locking said cylindrical member in position over said control shaft.

2. An aircraft anti-theft device as defined in claim 1 in which said locking means comprises a padlock having a pivotally mounted link portion and in which said cylindrical member has a centrally disposed peripherally extending slot adapted to closely receive said link portion.

3. An aircraft throttle locking device for use with an instrument panel-mounted engine control of the type typically found in light aircraft having a control shaft provided with a hand-grip knob at one end thereof, said shaft being mounted for telescopic movement relative to said instrument panel from an extended engine-inoperable position to a depressed engine-operable position, said device comprising:

a. an elongated rigid cylindrical member having a longitudinally extending slot therein of a width sufficient to closely receive the control shaft when the latter is in the engine-inoperable position, said member being adapted to substantially enclose said control shaft, and having formed therein:
      1. a centrally disposed peripherally extending slot; and
      2. a centrally disposed transversely extending slot having a width substantially greater than the width of said peripherally extending slot;
   b. a rigid hollow cylindrical housing integrally formed with said cylindrical member, said housing being open at one end and substantially closed at the opposite end and having a longitudinally extending slot formed in the periphery thereof and an axially aligned radially extending slot formed in the closed end thereof said slots of said housing being of a width to closely receive the control shaft to facilitate positioning of said housing over the hand-grip knob of the aircraft control; and
   c. a padlock having a pivotally mounted link portion and a body portion, said body portion being receivable in said transversely extending slot and said link portion being receivable in said peripherally extending slot.

4. An aircraft anti-theft device for use with an instrument panel-mounted engine control of the type typically found in light aircraft having a control shaft provided with a hand-grip knob at one end thereof, said shaft being mounted for telescopic movement relative to said instrument panel from an extended engine-inoperable position to a depressed engine-operable position, said device comprising:

a. a generally tubular shaped rigid housing receivable over and substantially covering said hand-grip knob said housing being open at one end and closed at its opposite end and said housing provided with a radially disposed slot formed in its closed end and longitudinally disposed slot formed in its periphery, said slots of said housing being of a width to closely receive the control shaft to facilitate positioning of said housing over the hand grip knob;

b. a generally tubular shaped rigid member integrally formed with said housing and receivable over said control shaft in the engine idle position to substantially enclose said control shaft, said member having a longitudinally extending slot of a width adapted to closely receive the control shaft and being of a length substantially coextensive with the control shaft in its extended position; and c. locking means for locking said member in an operable position over the control shaft.

5. An aircraft anti-theft device as defined in claim 8 in which said locking means comprises a padlock removably connected to said tubular shaped member for locking said member in its operable position over said control shaft, said padlock having a pivotally mounted link portion and a body portion, and said tubular shaped member being provided with a transversely extending slot adapted to receive said body portion and a peripherally extending slot adapted to receive said link portion.

6. An aircraft anti-theft device for use with an instrument panel-mounted engine control of the type typically found in light aircraft having a cylindrically shaped control shaft provided with a hand-grip knob at one end thereof, said shaft being mounted for telescopic movement relative to said instrument panel from an extended engine-inoperable position to a depressed engine-operable position, said device comprising:

a. an elongated generally tubular shaped rigid member having an enlarged diameter portion adapted to closely receive the hand-grip knob of the engine control and an integrally formed smaller diameter portion adapted to closely receive the control shaft, said smaller diameter portion being of a length substantially coextensive with the control shaft in its extended position, said member having a slot extending the entire length thereof said slot being of a width substantially equal to the diameter of the control shaft to facilitate positioning of said member over the engine control, whereby when said member is in operable position over the control shaft, telescopic movement of the engine control is prevented; and b. locking means for locking said member in an operable position over the control shaft.

* * * * *